United States Patent [19]
Yoshizawa

[11] Patent Number: 5,887,466
[45] Date of Patent: Mar. 30, 1999

[54] DOOR LOCK CONTROL SYSTEM WITH A DEAD LOCK DEVICE FOR AN AUTOMOTIVE VEHICLE

[75] Inventor: Takashi Yoshizawa, Sagamihara, Japan

[73] Assignee: Nissan Motor Co., Ltd., Yokohama, Japan

[21] Appl. No.: 751,099

[22] Filed: Nov. 15, 1996

[30]     Foreign Application Priority Data

Nov. 16, 1995  [JP]  Japan .................................. 7-298177

[51] Int. Cl.⁶ .................................................. F05B 65/36
[52] U.S. Cl. .................................. 70/257; 70/264; 70/267; 70/277; 292/201; 307/10.2; 340/426; 340/542
[58] Field of Search .......................... 70/264, 267–271, 70/277, 257; 292/DIG. 27, 201; 340/426, 542; 307/10.2

[56]             References Cited

U.S. PATENT DOCUMENTS

| | | | |
|---|---|---|---|
| 4,181,191 | 1/1980 | Hoffmann et al. | 70/264 X |
| 4,709,776 | 12/1987 | Metz | 70/264 X |
| 4,803,460 | 2/1989 | Rhee et al. | 70/DIG. 49 X |
| 4,805,427 | 2/1989 | Bates et al. | 70/264 |
| 4,805,723 | 2/1989 | Aoki et al. | 70/264 X |
| 5,054,300 | 10/1991 | Nakahara et al. | 70/264 X |
| 5,412,371 | 5/1995 | Kaplan | 307/10.2 X |
| 5,534,846 | 7/1996 | Kuroda | 70/264 X |
| 5,614,769 | 3/1997 | Kuroda | 70/264 X |
| 5,619,075 | 4/1997 | Spoto et al. | 70/264 X |
| 5,666,834 | 9/1997 | Inoue | 70/237 |
| 5,694,867 | 12/1997 | Diaz-Lopez | 109/6 |
| 5,715,713 | 2/1998 | Aubry et al. | 70/264 X |

FOREIGN PATENT DOCUMENTS

| | | |
|---|---|---|
| 40 28 837 | 3/1992 | Germany . |
| 42 33 887 | 4/1994 | Germany . |
| 44 40 839 | 5/1995 | Germany . |
| 44 44 581 | 6/1995 | Germany . |
| WO95/18904 | 7/1995 | WIPO . |

*Primary Examiner*—Lloyd A. Gall
*Attorney, Agent, or Firm*—Foley & Lardner

[57]                ABSTRACT

A door lock system includes a door lock mechanism, and a connecting mechanism whereby the door lock mechanism and the door lock knob are connected to permit unlocking using the door lock knob, when the motion sensor detects movement inside the vehicle within a predetermined time after the door lock mechanism and the door lock knob are disconnected to prohibit unlocking using the door lock knob.

12 Claims, 10 Drawing Sheets

DOOR LOCK CONTROL SYSTEM WITH A DEAD LOCK DEVICE FOR AN AUTOMOTIVE VEHICLE

The contents of Japanese Application No. TOKUGAN-HEI 7-298177, with a filing date of Nov. 16, 1995 are hereby incorporated by reference.

BACKGROUND OF THE INVENTION

1. Field of the Invention

This invention relates to a door lock control system for an automotive vehicle with a dead lock device which can prevent unlocking of the door lock using the door lock knob and with an anti-theft device which alarms an invasion into the vehicle.

2. Related Art of the Invention

A door lock system for a vehicular door with a device which can prohibit the unlocking of the door with a door lock knob placed inside the vehicle is known (See JITSUK-OUHEI 4-24046). This door lock system avoids a thief attempting to unlock the vehicular door from operating the door lock knob with a wire hook.

Hereinafter this kind of door lock system is called "dead lock" system, and "to set the dead lock" means to disable the unlocking of the door with the door lock knob and "to release the dead lock" means to enable the unlocking of the door with the door lock knob.

FIG. 12 shows another related system which includes a door lock knob 11, a door lock mechanism 10, and a connecting mechanism 12.

The door lock mechanism 10 locks and unlocks the door, and the door lock knob 11 is disposed inside the vehicle so that the driver or the passenger can move it to either the lock position or the unlock position. The connecting mechanism 12 is placed between the door lock mechanism 10 and the door lock knob 11. A link 13 couples the door lock knob 11 and the connecting mechanism 12, and a link 14 couples the door lock mechanism 10 and the connecting mechanism 12. A dead lock actuator activates the connecting mechanism 12 and makes the connecting mechanism 12 connect and disconnect the link 13 and the link 14.

In this door lock system, when the dead lock is released, the door lock mechanism 10 and the door lock knob 11 are operatively connected. Therefore, when the driver moves the door lock knob 11 to the lock position, the door lock mechanism 10 is moved from the unlock condition to the lock condition, interlocking the door lock knob 11, the link 13, and the link 14. And when the door lock knob 11 is moved to the unlock position, the door lock mechanism 10 is moved from the lock condition to the unlock condition.

On the other hand, when the dead lock is set, the door lock mechanism 10 and the door lock knob 11 are disconnected. Therefore, even if the driver moves the door lock knob 11 to the unlock position, the door lock mechanism 10 remains in the unlock condition.

In case the driver leaves his/her pet in a vehicle with the above-mentioned door lock system and the driver loses the key, the dead lock which has been set provides ones with an enormous difficulty in rescuing the pets.

SUMMARY OF THE INVENTION

Accordingly, it is therefore a general object of the invention to provide a door lock system which will obviate or minimize difficulties of the type previously described.

It is a specific object of the invention to provide a door lock system for an automotive vehicle which automatically releases the dead lock when the driver inadvertently leaves his/her pet inside the vehicle.

It is another object of the invention to provide a door lock system having a still efficient anti-theft device even after the dead lock has been released.

It is still another object of the invention to provide a door lock system having an efficient anti-theft device when pets are not left inside the vehicle.

A preferred embodiment of the present invention which is intended to accomplish the foregoing objects includes a door lock mechanism for locking and unlocking a vehicular door, a motion sensor for detecting movement inside the vehicle, a connecting mechanism, and a connecting actuator. When the motion sensor detects movement inside the vehicle within a predetermined time after the door lock mechanism and the door lock knob have been disconnected, i.e., in a deadlocked condition, to prohibit unlocking using the door lock knob, the connecting actuator moves the connecting mechanism so that the door lock mechanism and the door lock knob are connected again to permit unlocking using the door lock knob.

Another preferred embodiment of the present invention further includes an invasion sensor and an anti-theft controller for monitoring the vehicle. When the motion sensor detects movement inside the vehicle during the predetermined time, the anti-theft controller monitors the vehicle with the invasion sensor only after a predetermined time has elapsed since the vehicular door was locked and the door lock mechanism and the door lock knob are disconnected.

In still another preferred embodiment of the invention, the anti-theft controller monitors the vehicle with both the invasion sensor and the motion sensor after a predetermined time has elapsed, when either the motion sensor does not detect movement inside the vehicle or the invasion sensor does not detect the invasion during the predetermined time.

Yet still another preferred embodiment of the present invention provides a door lock mechanism for locking and unlocking a vehicular door, a lock securing mechanism for securing the door lock mechanism, a motion sensor for detecting movement inside the vehicle, and a lock securing controller. When the motion sensor detects movement inside the vehicle within a predetermined time after the lock securing mechanism secures the door lock mechanism, the securing controller releases the locking mechanism from the secured condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate the presently preferred embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
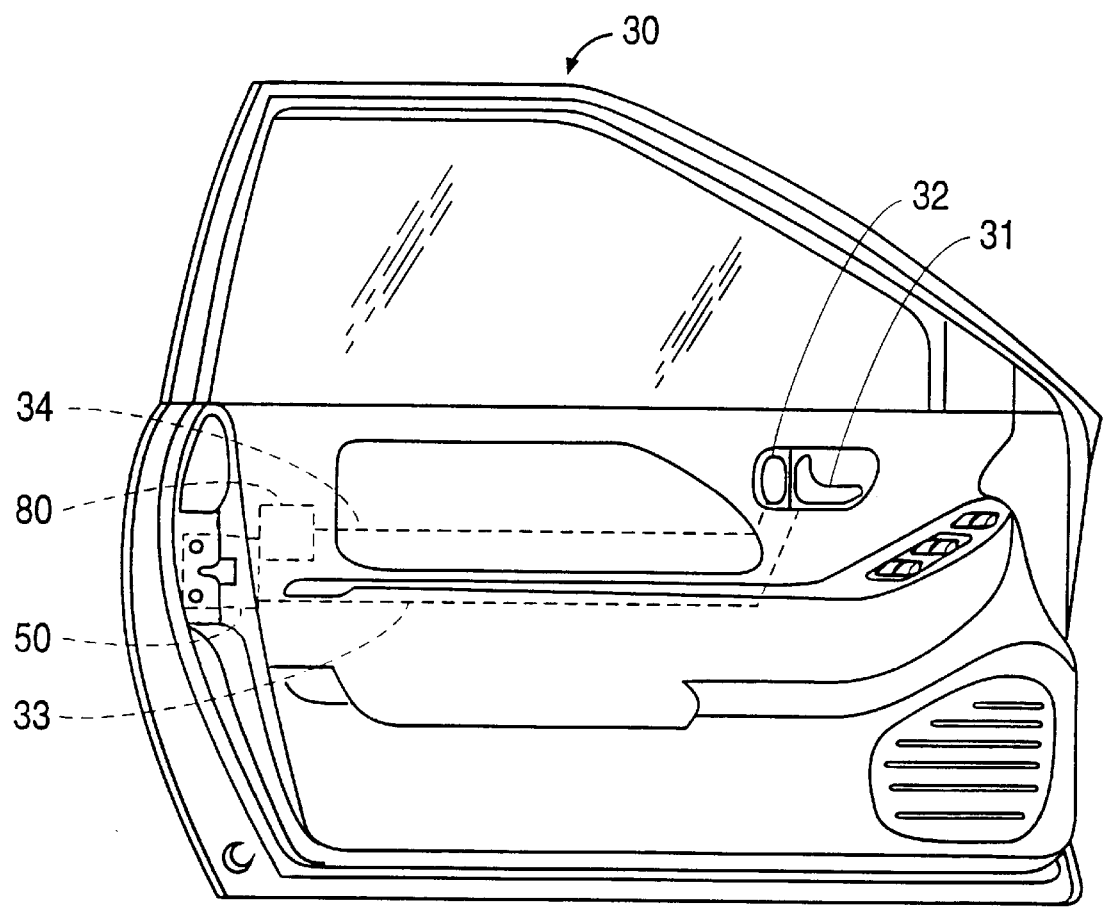
FIG. 1 is a schematic perspective view of a vehicular door according to a first preferred embodiment of the present invention.

Refer now to the drawings, wherein like numerals indicate like parts, and initially to FIG. 1, which shows a driver's door 30 seen from inside the vehicle. A vehicle generally has four doors and the lock system of the present invention is applied to all of the doors.

The driver's door 30 has an inside door handle 31 and a door lock knob 32, both operated by the driver. A door lock mechanism 50 and a connecting mechanism 80 are disposed inside the driver's door 30. The door lock mechanism 50 is connected to the connecting mechanism 80 and the inside door handle 31 by a link 33. The connecting mechanism 80 is connected to the door lock knob 32 by a link 34.

Figure 2:
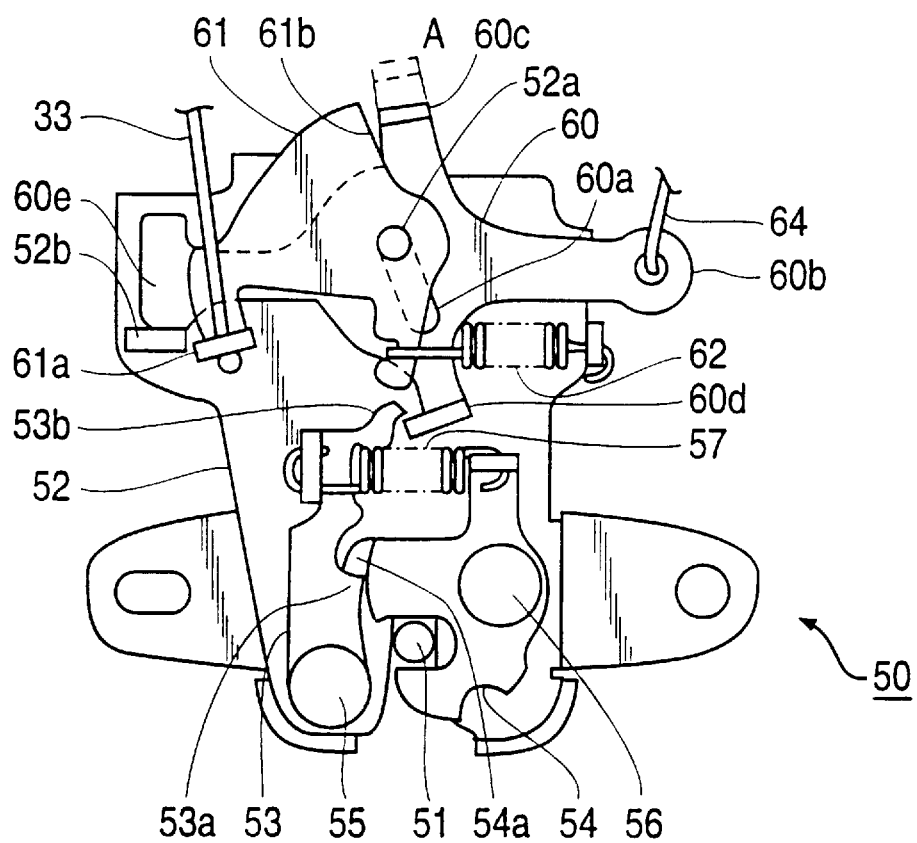
FIG. 2 is a schematic side view of a locking mechanism according to the first preferred embodiment of the present invention.

FIG. 2 illustrates the door lock mechanism 50 in detail. The base 52 is fixed inside the door 30, the hook 54 rotates around the axis 56 fixed on the base 52. The hook 52 hooks and releases the striker 51 fixed on the proper position at the body of the car (not shown). The latch 53 rotates around the axis 55 fixed on the base 52. The latch 53 and the hook 52 are engaged at the latch edge 53a and the hook edge 54a by the tension force of a spring 57.

An opening lever 60 is located on the base 52 and is penetrated through the elongated hole 60a by the pin 52a standing out of the base 52. The arm 60b of the opening lever 60 is connected to the locking actuator (described below) by a link 64. The part 52b thrusts out close to the arm 60e of the opening lever 60.

The handle lever 61 is located above the opening lever 60, and rotates around the pin 52a, The arm 61a of the handle lever 61 is connected to the inside door handle 31 and outside door handle (not shown) by the link 33.

When the door 30 is unlocked, the opening lever 60 is positioned as shown in FIG. 2. When either the inside door handle 31 or the outside door handle is pulled, the link 33 is pulled upward in FIG. 2, and the handle lever 61 rotates around the pin 52a in a clockwise direction in FIG. 2. Accordingly, the edge 61b of the handle lever 61 pushes the arm 60c of the opening lever 60, and the opening lever 60 rotates around the pin 52a in a clockwise direction.

The arm 60d of the opening lever 60 contacts with the arm 53b of the latch 53. When the opening lever 60 rotates clockwise, then the latch 53 rotates around the axis 55 counterclockwise, and the latch edge 53a and the hook edge 54a are disengaged. Therefore, the hook 54 rotates around the axis 56 counterclockwise with the force applied by the spring 57 and releases the striker 51, and the door 30 is opened.

When the door 30 is locked, the link 64 is pulled upward in FIG. 2. The opening lever 60 rotates around the contact part of the arm 60e and the thrust-out part 52b as a fulcrum, and the elongated hole 60a moves along the pin 52a, Accordingly, the arm 60c moves to the position A indicated with broken line in FIG. 2.

In these circumstances, when the link 33 is pulled by the door handle and the handle lever 61 rotates, then edge 61b of the handle lever 61 has no contact with the arm 60c of the opening lever 60. Therefore, the door 30 cannot be opened.

Figure 3:
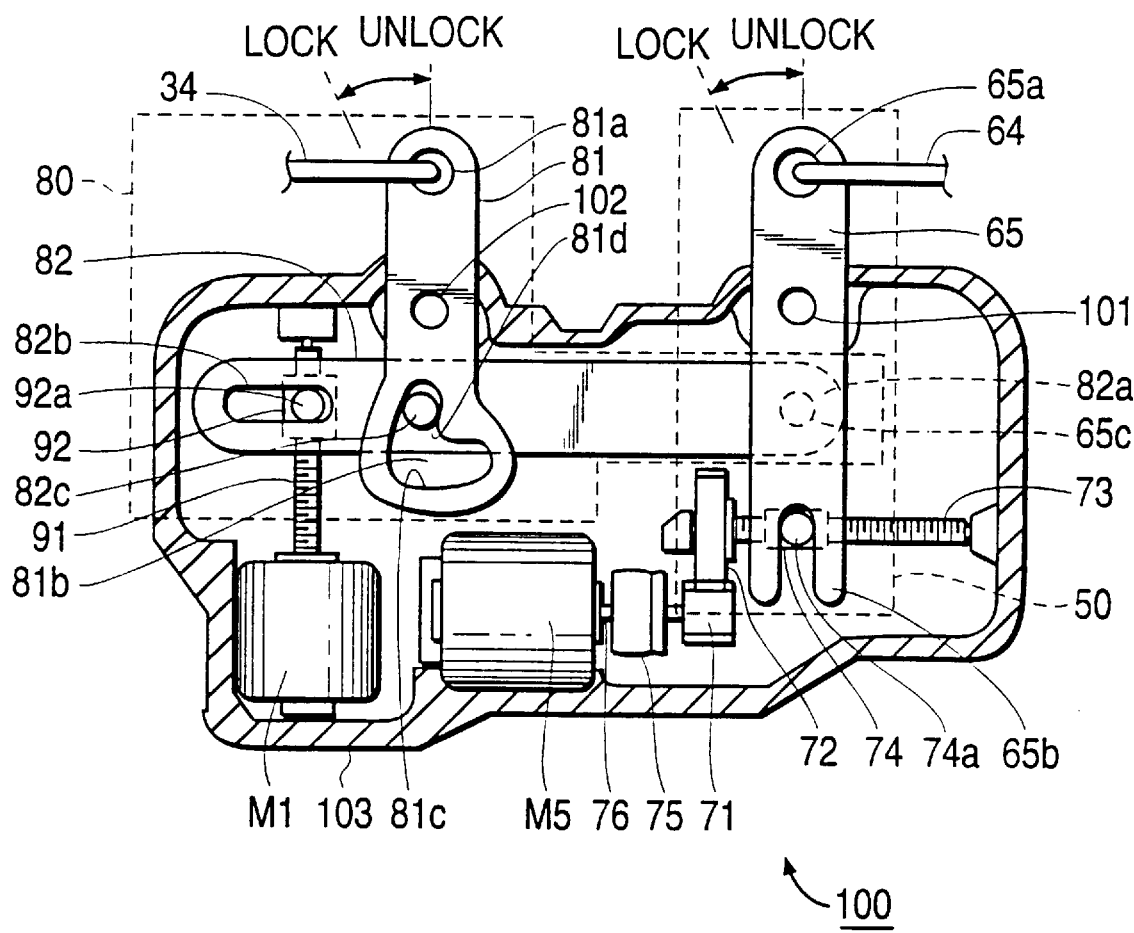
FIG. 3 is a schematic side view of a dead lock actuator according to the first preferred embodiment of the present invention.

FIG. 3 illustrates a preferred embodiment of the dead lock actuator 100 in the present invention. The dead lock actuator 100 comprises a lock lever 65, a connecting lever 82, a free lever 81, a locking actuator M5, and a connecting actuator M1. The lock lever 65 composes a part of the locking mechanism 50, and both the connecting lever 82 and the free lever 81 comprises the connecting mechanism 80.

In detail, the locking actuator M5, using an electric motor, is disposed on the casing 103 of the dead lock actuator 100. The rotation shaft 76 of the locking actuator M5 is connected to a gear 71 through a centrifugal clutch 75. The centrifugal clutch 75 connects the rotation shaft 76 and the gear 71 only when the rotation shaft 76 is rotating. The gear 71 meshes another gear 72, which rotates the worm shaft 73. A worm nut 74 is placed around the worm shaft 73 so that the worm nut 74 moves linearly according to the rotation of the worm shaft 73.

The fork 65b of the lock actuator lever 65 sandwiches the pin 74a of the worm nut 74. The lock actuator lever 65 rotates around the axis 101 perpendicular to the casing 103. The end 65a of the lock actuator lever 65 is coupled with the link 64 coupling to the open lever (see in FIG. 2). Therefore, responsive to the rotation of the locking actuator M5, the lock actuator lever 65 moves and the door is locked and unlocked.

A pin 65c stands out of the lock actuator 65, and the end 82a of the connecting lever 82 is supported by it. The other end of the connecting lever 82 has an elongated hole 82b, which sandwiches the pin 92a of the worm nut 92. The worm nut 92 slides along the worm shaft 91 rotated by the connecting actuator M1. The connecting lever 82 changes the position according to the rotation of the connecting actuator M1.

The pin 82c stands out of the connecting lever 82. The pin 82c is inserted into the hole 81b of the free lever 81. The free lever 81 rotates around the axis 102 perpendicular to the casing 103. The hole 81b includes the two portions 81c and 81d, located in a different distance from the axis 102. The portion 81d is tight along the rotating directing of the free lever 81, while the portion 81c is elongated along the rotating direction. The end 81a of the free lever is connected to the door lock knob 32 (see FIG. 1) through the link 34.

When each of the levers is positioned as in FIG. 3, the door lock is unlocked and the dead lock is released. Therefore, when the door lock knob 32 is moved to the locked position, then the free lever 81 rotates counterclockwise in FIG. 3. Because the pin 82c of the connecting lever engages with the portion 81d of the hole 81b on the free lever 81, the connecting lever 82 moves to right. Accordingly, the lock actuator lever 65 is rotated counterclockwise, the link 64 is pulled to the locking position and the door lock mechanism 50 in FIG. 2 unlocks the door.

Similarly, when the door lock knob 32 is positioned in the locking position, the link 34, the free lever 81, the connection lever 82, the lock actuator lever 65, and the link 64 interlock to lock the door.

In this situation, the centrifugal clutch disconnects the rotation shaft 76 and the gear 71 because the rotation shaft 76 does not rotate. Therefore, the friction against the rotation of the lock actuator lever 65 is very small and the lock actuator lever 65 can rotate smoothly.

Besides, when the locking actuator M5 is activated by the signal (mentioned below when referring to FIG. 5), the lock actuator lever 65 is moved to lock and unlock the door. Simultaneously, the connection lever 82, the free lever 81, the link 34, and the door lock knob 32 are moved to the locking position or the unlocking position.

Figure 4:
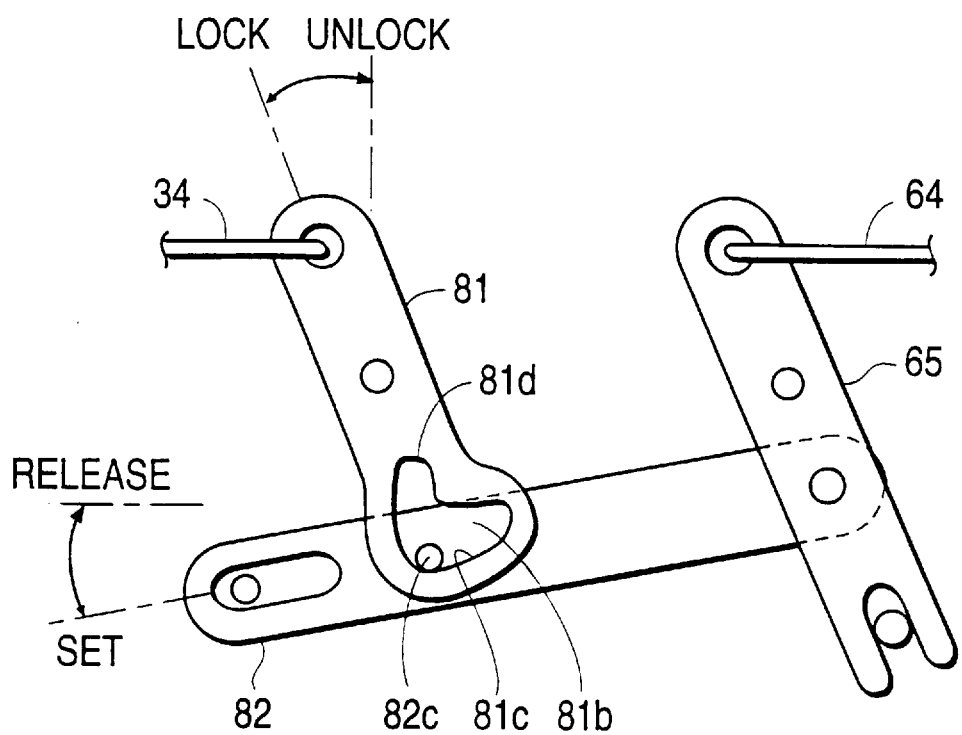
FIG. 4 is another schematic side view of a dead lock actuator according to the first preferred embodiment of the present invention.

FIG. 4 illustrates, in a simplified drawing, the dead lock actuator 100 with the dead lock set and with the door lock in locking condition. The connecting actuator M1 moves down the pin 92a, and the connecting lever 82 rotates until the pin 82c reaches the portion 81c in the hole 81b of the free lever 81.

In these circumstances, when the door lock knob 32 is positioned to the unlock position, the free lever 81 rotates. However, the connection lever 82 can not be moved because the pin 82c is in the portion 81c in the hole 81b and the hole 81b and the pin 82c do not have contact enough to move the connection lever 82. Therefore, even if a thief moves the door lock knob 32, he/she can not unlock the door when the dead lock is set.

Figure 5:
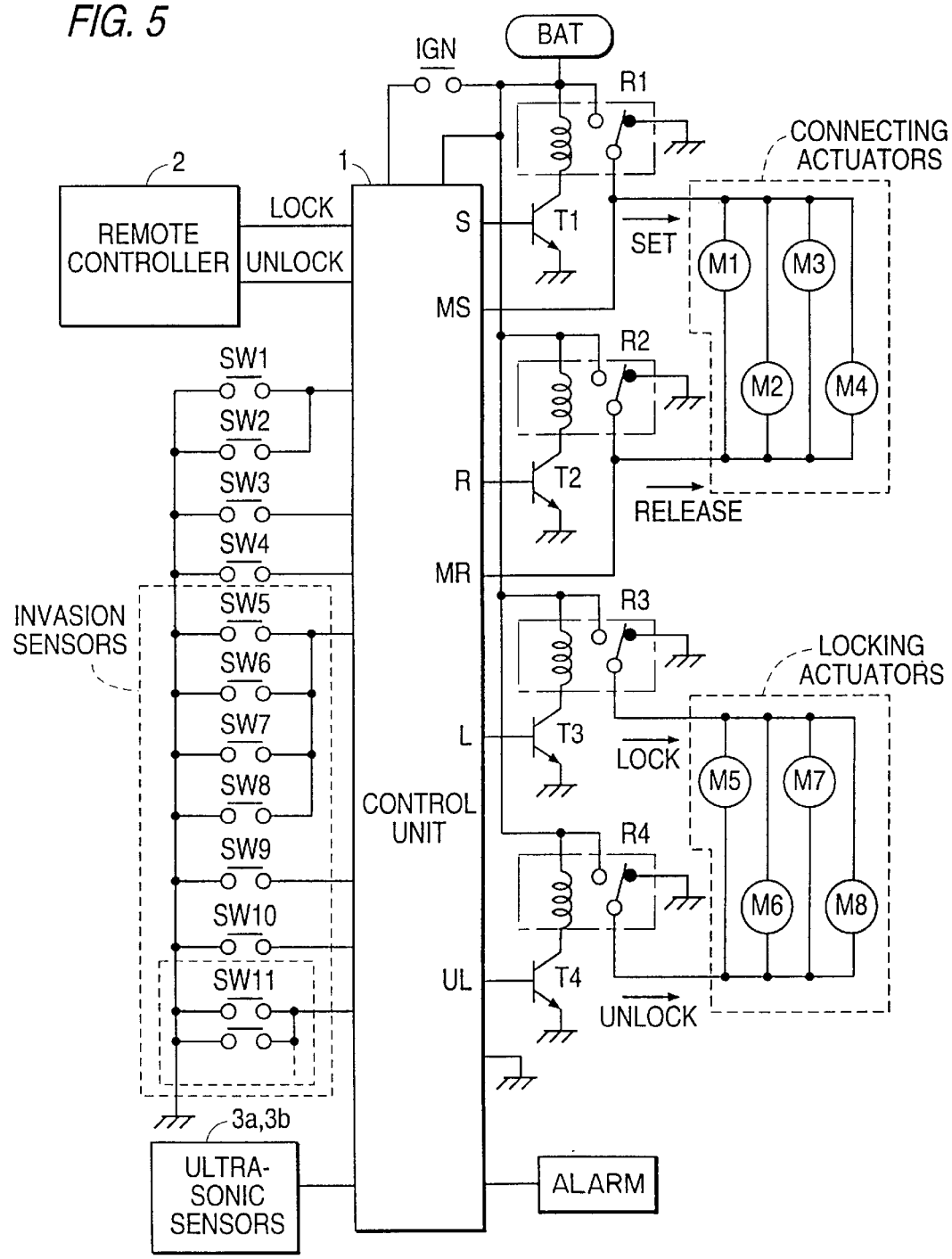
FIG. 5 is a circuit diagram of a door lock system according to the first preferred embodiment of the present invention.

FIG. 5 shows a circuit to control the door lock system of the invention. Referring to FIG. 5, the control unit 1 includes a micro computer and several peripheral devices, such as input/output devices, a memory chip, etc. The control unit 1 controls to lock and unlock the doors of the vehicle, as well as set and release the dead lock of each door: the driver door, the front right door, the rear right door, and the rear left door.

M1 through M4 are the connecting actuators placed on the driver's door, the front right door, the rear right door, and the rear left door, respectively. The connecting actuators M1 through M4, as mentioned above by referring to FIG. 3, moves the connecting mechanism in order to set and release the dead lock.

M5 through M8 are the door lock actuators placed on the driver door, the front right door, the rear right door, and the rear left door, respectively. The door lock actuators M1 through M4, as mentioned above by referring to FIGS. 3 and 4, moves the connecting mechanism in order to set and release the dead lock.

R1, R2 are respectively the set relay and the release relay. The relays R1, R2 usually contact to the terminal connected to ground level.

When the transistor T1 is turned on by the set signal outputted from the terminal S of the control unit 1, the set relay R1 is switched into the terminal connected to the battery BAT. Accordingly, the current is applied from the battery BAT to the connecting actuators M1 to M4 through the set relay R1, the connecting actuators M1 through M4 are moved to set the dead locks.

Additionally, when the transistor T2 is turned on by the release signal outputted from the terminal R of the control unit 1, the release relay R2 is switched into the terminal connected to the battery BAT. Accordingly, the current is applied from the battery BAT to the connecting actuators M1 to M4 through the release relay R2, the connecting actuators M1 through M4 are moved to release the dead locks.

Besides, the current applied through the set relay R1 is monitored by the control unit 1 with the terminal MS, and the current applied through the release relay R2 is monitored with the terminal MR, in order to confirm the activation of the actuators.

R3, R4 are respectively the lock relay and the unlock relay. The relays R3, R4 usually contact to the terminal connected to ground level.

When the transistor T3 is turned on by the lock signal outputted from the terminal L of the control unit 1, the lock relay R3 is switches to the terminal connected to the battery BAT. Accordingly, the current is applied from the battery BAT to the door lock actuators M5 to M8 through the lock relay R3, and the door lock actuators M5 through M8 are moved to lock the doors.

Additionally, when the transistor T4 is turned on by the unlock signal outputted from the terminal UL of the control unit 1, the unlock relay R4 is switched to the terminal connected to the battery BAT. Accordingly, the current is applied from the battery BAT to the door lock actuators M5 to M8 through the unlock relay R4, the connecting actuators M5 through M8 are moved to unlock the doors.

Figure 6:
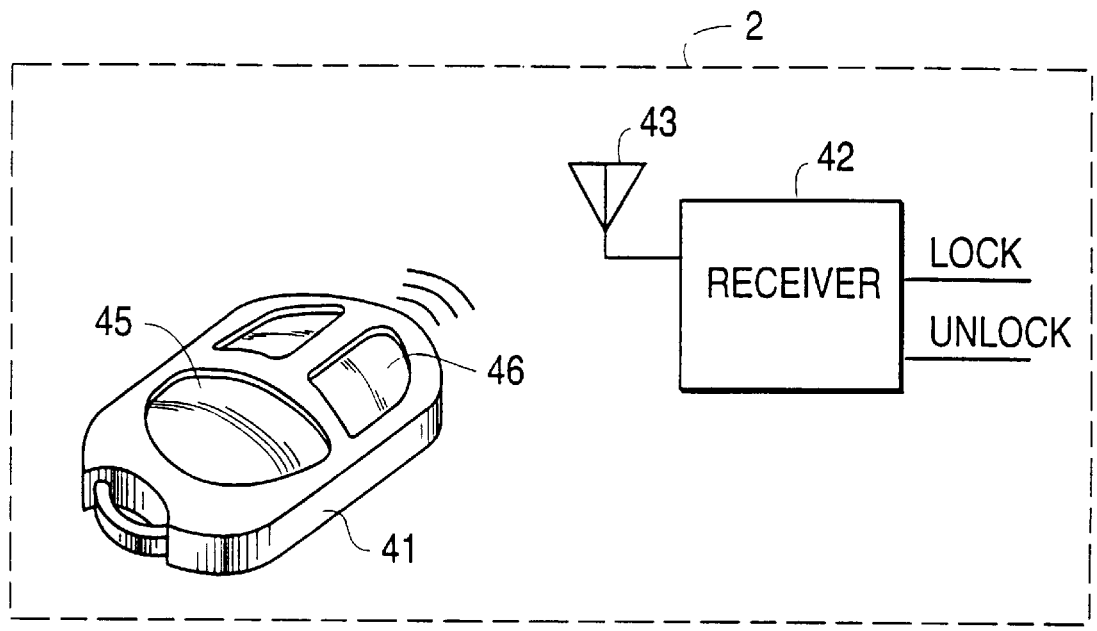
FIG. 6 is a block diagram of a remote controlled door lock device according to the first preferred embodiment of the present invention.

Furthermore, the remote controlled door lock device (hereinafter the remote controller) 2 is connected to the control unit 1. The remote controller 2 is illustrated in FIG. 6. The transmitter 41 carried with the driver has a lock switch 45 and an unlock switch 46. When either switch 45 or 46 is depressed, the transmitter 41 transmits the radio signal to lock or unlock the doors.

The receiver 42 receives the radio signal from the transmitter 41 with the antenna 43, and transfers the radio signal into an electric signal and sends the locking or unlocking signal to the control unit 1.

Referring to FIG. 5, again, ultra-sonic sensors 3a, 3b detect the motion inside the vehicle, such as caused by a pet left inside the vehicle. The ultra-sonic sensors 3a, 3b are located on the ceiling close to the windows, as shown in FIG. 7.

In variations of the invention, as a motion sensor, detecting the motion inside the vehicle, an infrared sensor, a camera and a processor for processing the image monitored by the camera, or a light emitter and an sensor receiving the light emitted by the light emitter, etc. can be used instead of the ultra-sonic sensors 3a, 3b.

Figure 7:
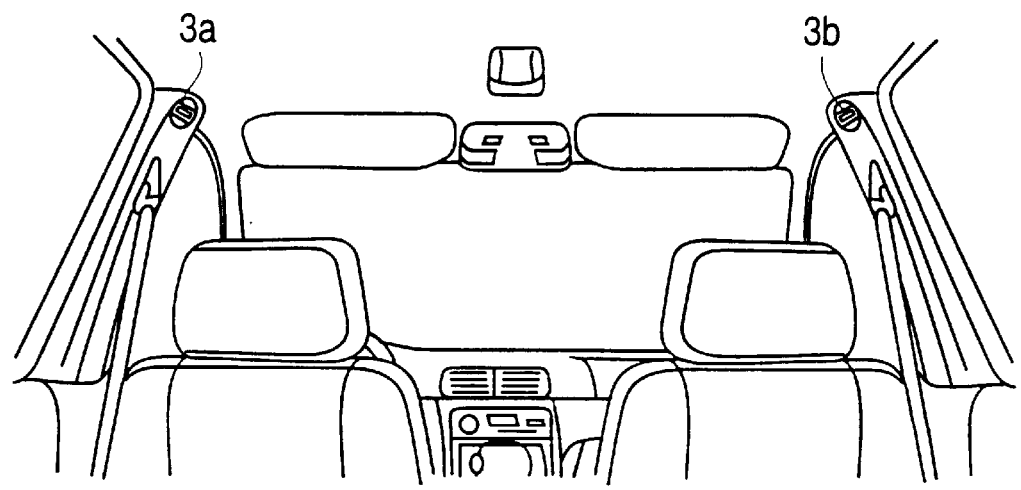
FIG. 7 is a perspective view of the inside of a vehicle showing the location of ultra-sonic sensors according to the first preferred embodiment of the present invention.

The location of the motion sensors, including the ultra-sonic sensors 3a, 3b, are not limited to the position shown in FIG. 7, but may be located at any location where the motion inside the vehicle can be detected.

Referring to FIG. 5, several switches are connected to the control unit 1 to detect the condition of the vehicle.

Ignition switch IGN is closed (hereinafter ON) when the ignition key is positioned in either "On" or "Start". The switch SW1 is ON when the key cylinder of the driver's door is rotated to the lock position, and the switch SW2 is ON when the key cylinder of the front right door is rotated to the lock position. The switch SW3 is ON when the driver's door is locked, and the switch SW4 is ON when the front right door is locked.

The switches SW5 to SW8 are ON when the driver's door, the front right door, the rear right door, and the rear left door are opened, respectively. The switch SW9 is ON when the engine hood is opened, and the switch SW10 is ON when the trunk lid is opened.

The tamper switch SW11 includes a plurality of switches which are ON when the key cylinder is tampered or removed from the door, and each switch is disposed on every door having a key cylinder, such as the driver's door, the front right door, trunk lid, etc. These switches are connected in parallel, so that ON status of either one of these switches is inputted into the control unit.

These switches SW5 through SW11 detect the unauthorized entrance into the vehicle and thereafter trigger an alarm or other vehicle operation inhibiting mechanism, as is widely known in the related art.

Figure 8:
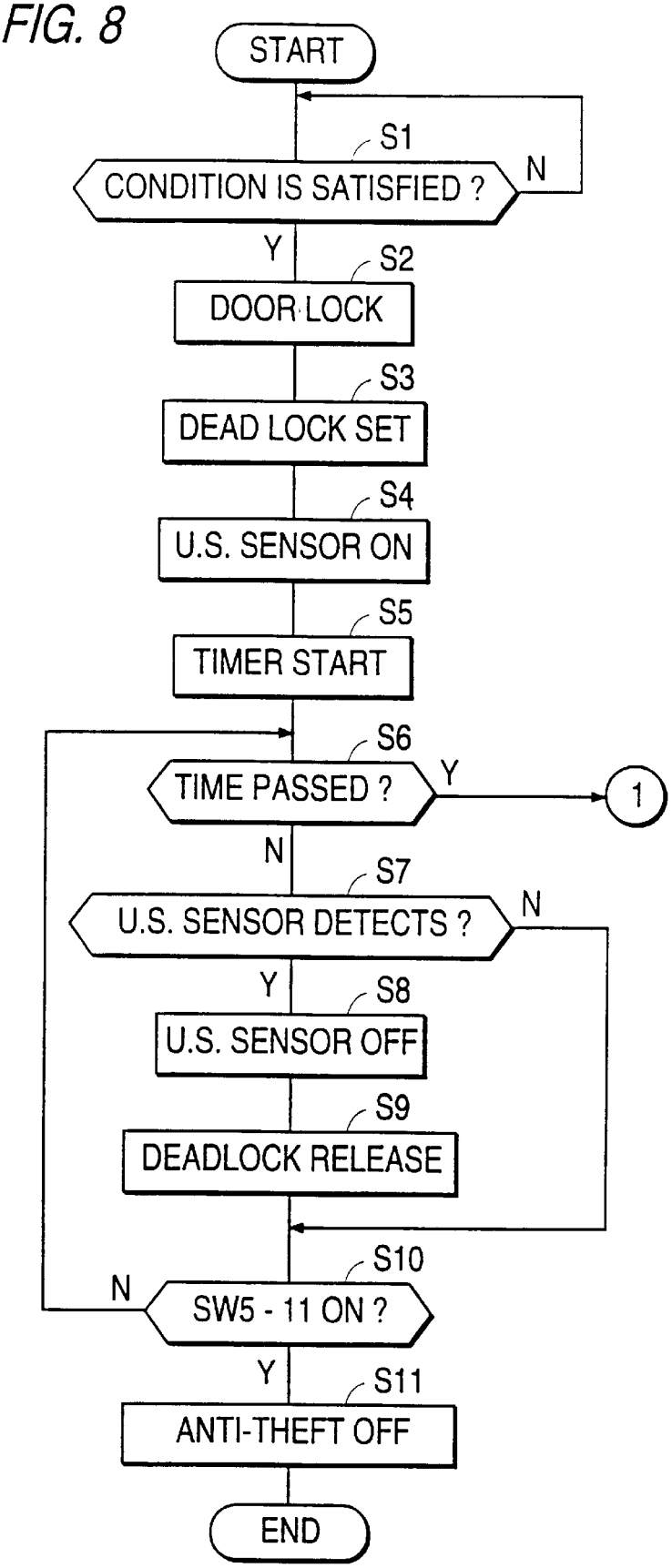
FIGS. 8 through 10 are flow charts for controlling the door lock system according to the first preferred embodiment of the present invention.
Figure 9:
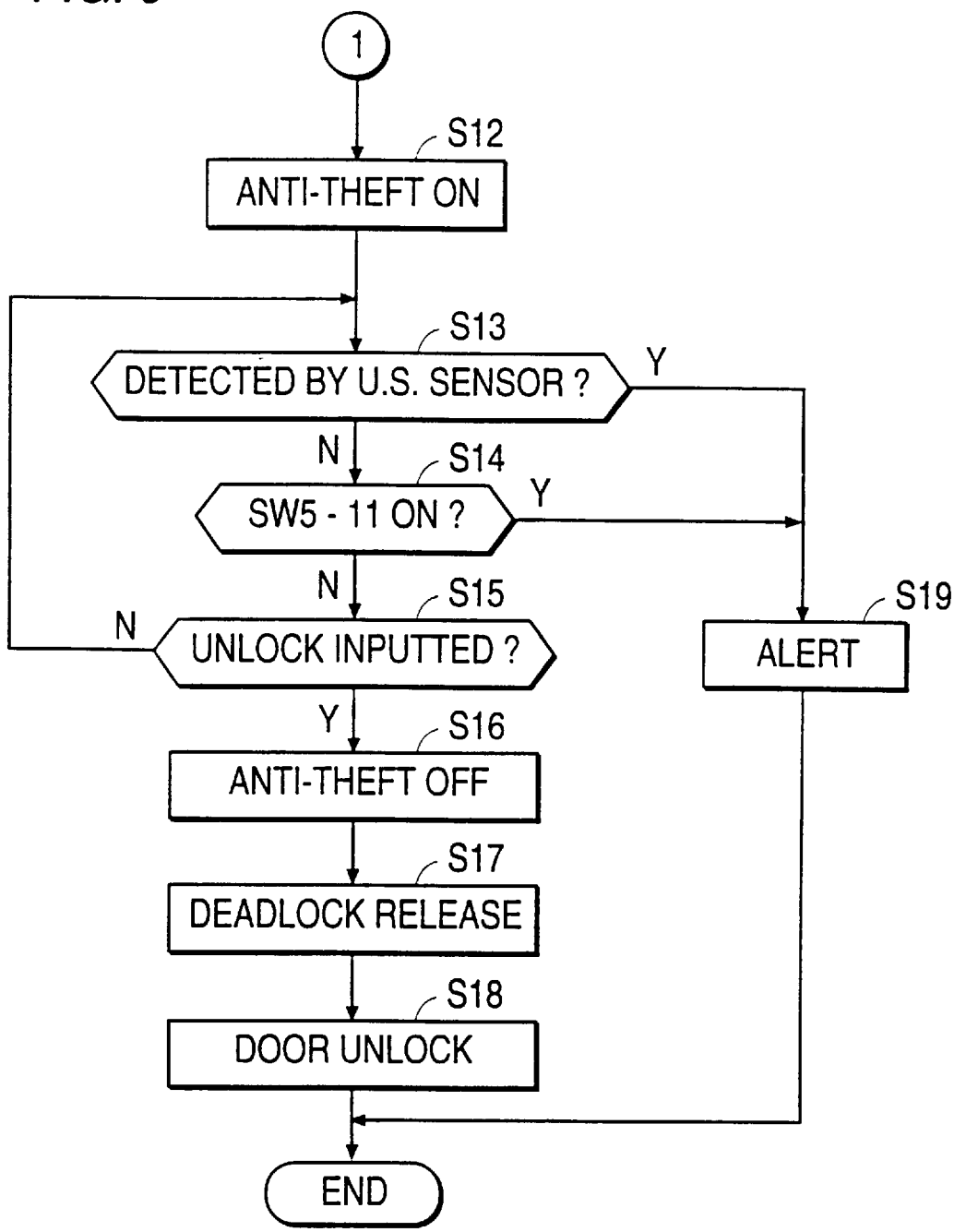
Figure 10:
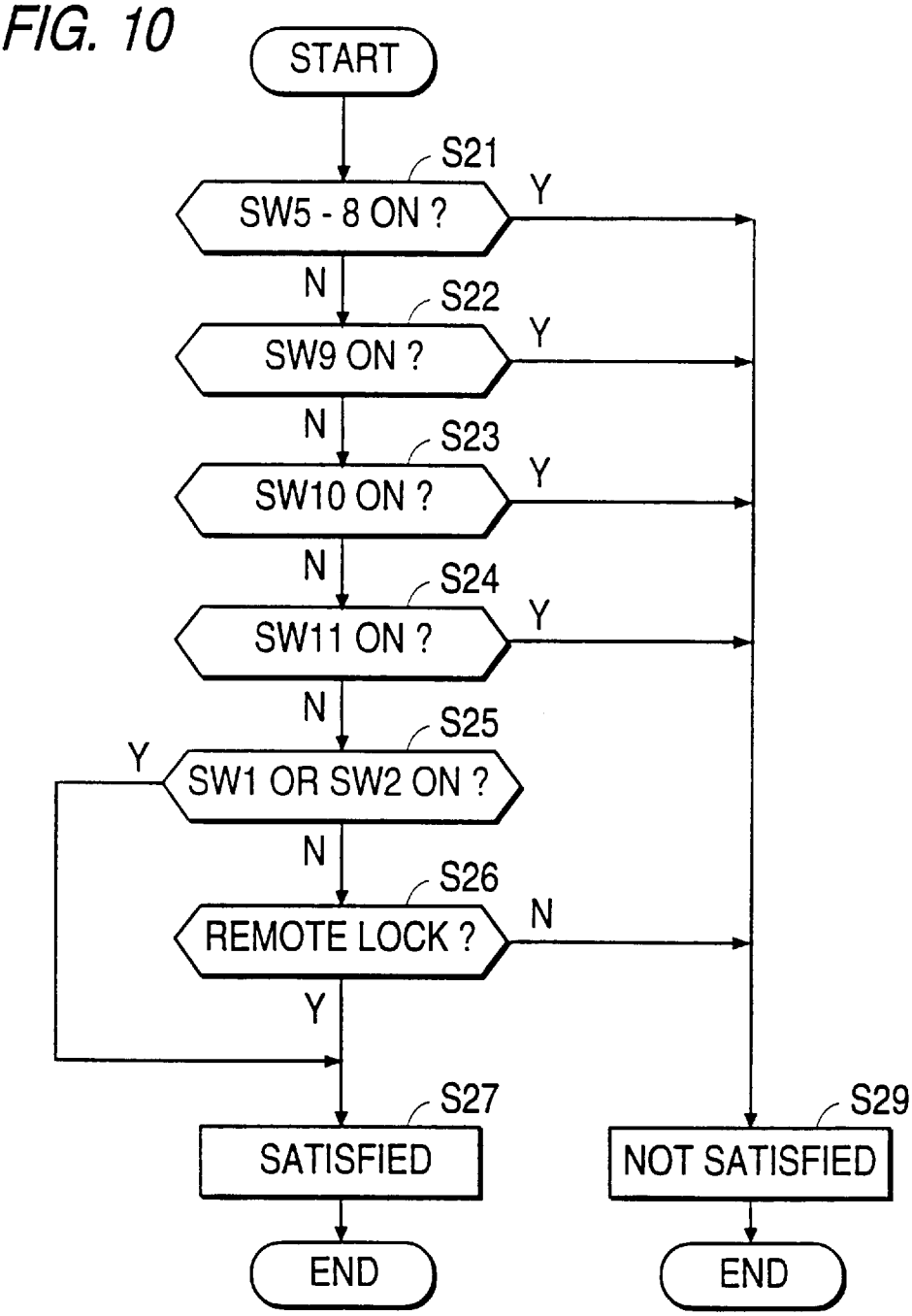

FIGS. 8 through 10 show a routine which operates the door lock system as follows.

At step S1, it is inquired whether the condition to lock the doors is satisfied or not. The decision is made by the processes in FIG. 10. At step S21 in FIG. 10, it is inquired whether either one of the switches SW5 through SW8 is ON; i.e., whether one of the doors of the vehicle is open. At step S22, it is inquired whether the switch SW9 is ON or not; i.e., whether the engine hood is open. And the next step S23, it is inquired whether the switch SW10 is ON or not; i.e., whether the trunk lid is open. At step S24, it is inquired whether the switch SW11 is ON or not; i.e., whether one of the key cylinders is removed from the car.

At step S25, it is inquired whether either one of the switches SW1 and SW2 is ON or not; i.e., whether the either key cylinder is rotated to the lock position. And the next step S26, it is inquired whether the remote controller 2 outputs the signal for locking the door.

If it is decided "Yes" at one of the steps among S21 through S24 (i.e., at least one of the doors is open, the engine hood or the trunk lid is open, or at least one of the key cylinders is removed), then in step S29 a decision is made that the condition for door lock is not satisfied.

If "Nos" are obtained at all steps from S21 through S24 (i.e., all the doors, the engine hood and the trunk lid are closed, and all the key cylinders are not removed), and the decision at step S25 or step S26 is "Yes" (i.e., it is met when locked using the key or remote controller 2), then in step S27 the condition for door lock is satisfied. Subsequently, the control proceeds to step S2 in FIG. 8.

If "No" is obtained at all steps from S21 through S24, and the decision at step S25 and step S26 is "No" (i.e., it is not required to lock the door using the key or remote controller 2), then step S29 is provided.

Referring to FIG. 8, step S1 is repeated until the condition for locking the door is satisfied. If the condition is satisfied, at step S2 the lock signal is outputted from the terminal L of the control unit 1 (See FIG. 5). Therefore, the door lock actuator M5 through M8 lock all doors.

At step S3, the set signal is outputted from the terminal S of the control unit 1 (See FIG. 5). Therefore, the connecting actuator M1 through M4 set the dead locks of all doors.

Next, at step S4, the ultra-sonic sensors 3a, 3b start operating. At step S5, a timer starts counting, and at step S6 it is inquired whether the predetermined time has elapsed or not. If the predetermined time has not elapsed ("No" branch at step S6), the next step is step S7. At step S7, it is inquired whether a movement in the vehicle is detected by the ultra-sonic sensors 3a, 3b. If it is decided "No" (i.e., no movement is detected), then step S10 is executed, and if it is decided "Yes" (i.e., a movement is detected), step S8 is provided. At step S8, ultra-sonic sensor 3a, 3b stops detecting a movement in the vehicle, and thereafter the control unit 1 will ignore the state of the sensors, for instance, for triggering the anti-theft device. Otherwise, turning off the power supply to the ultra-sonic sensors 3a, 3b, bypassing the signal from the sensors 3a, 3b, or disconnecting the sensors and the control unit 1 can similarly function. In the next step S9, the release signal is outputted from the terminal R of the control unit 1 (See FIG. 5). Therefore, the connecting actuator M1 through M4 release the dead locks of all doors, although, preferably, only a selected door such as a rear door could be released while others being dead-locked. This arrangement provides an even more enhanced level of security against a car thief.

At step S10, it is inquired whether or not either one of the switches SW5 through SW11 is turned ON. If no switch is turned ON ("No" at step S10), then step S6 is provided. On the other hand, if either switch is turned ON ("Yes" at step S10), then step S11 is provided. At step S11, the anti-theft device is turned off and the routine is ended because it is considered that the door is opened from the inside the passenger compartment, or the trunk lid or a hood is opened by the driver just after he/she locked the door, i.e., within the predetermined time (preferably 10–30 seconds).

If it is decided the predetermined time has passed ("Yes") at step S6, then step S12 in FIG. 9 is provided.

At step S12, the anti-theft device is turned on for detecting the invader into the vehicle. At the step S13 it is inquired whether or not any movement is detected by the ultra-sonic sensors 3a, 3b, and at the step S14 it is inquired whether or not either one of the switches SW5 through SW11 are turned ON. If some movement is detected by the ultra sonic sensors 3a, 3b (i.e., "Yes" at step S13) or either switch SW5 through SW11 is turned ON (i.e., "Yes" at step S14), then step S19 is provided because it is considered that the vehicle experiences unauthorized entrance. And at step S19, the alarm is raised, for example by honking the horn and flashing the headlights simultaneously. If both steps S13 and S14 judges "No", then step S15 is provided.

At step S15, it is inquired whether unlocking the doors is required by using the remote controller 2 or the door key cylinder. If it is judged "Yes" at step S15, then steps S16 through S18 are provided, and at each step the anti-theft device is turned off, the dead locks are released, and the doors are unlocked.

Figure 11:
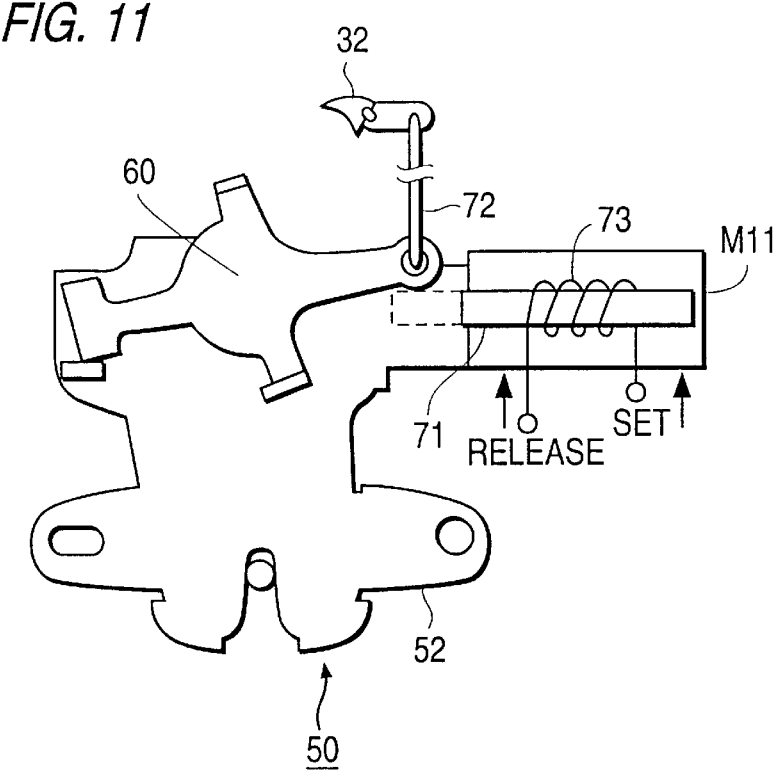
FIG. 11 is a schematic side view of a dead lock device according to a second preferred embodiment of the present invention.
Figure 12:
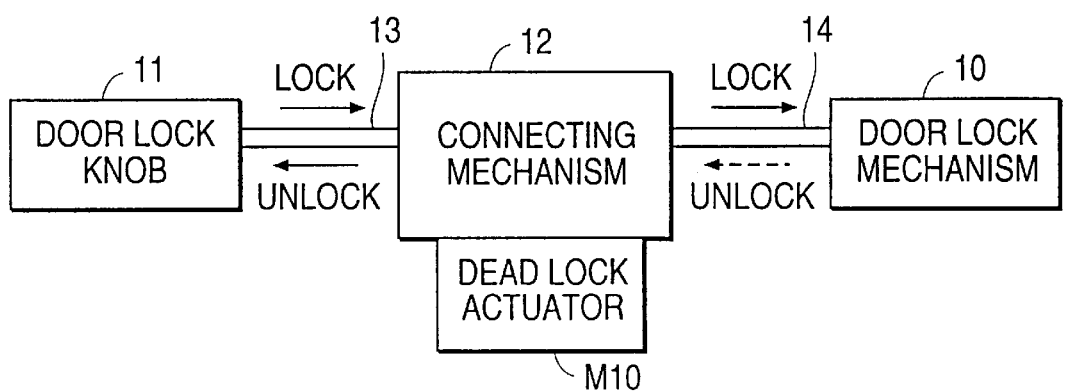
FIG. 12 is a block diagram of a door lock system according to the prior art.

FIG. 11 illustrates the second preferred embodiment of the present invention. This embodiment is applied to a securing device restricting the door lock mechanism.

The door lock mechanism 50 has the same structure as that in the first embodiment. The open lever 60 is connected to the door lock knob 32 by the link 72. The actuator M11 is coupled to the base 52. The actuator M11 has a solenoid 73 of which terminals are electrically connected to the relay R1 and R2 shown in FIG. 5. A magnetized plunger 71 is inserted in the solenoid 73 so that the plunger 71 moves in and out.

The other devices in this embodiment are same as in the first embodiment, and the mechanism in this embodiment is operated according to the same flow charts shown in FIGS. 8 through 10.

When the door lock signal is inputted from the remote controller 2 or the switch SW1 or SW2, the door mechanism 50 is positioned in the locking condition. Thereafter, the set current is applied to the actuator M11 so that the plunger 71 moves out and hold the opening lever 60 in the locking condition.

When the door unlock signal is inputted, the release current is applied to the actuator M11 so that the plunger 71 moves in and the opening lever 60 is moved to the unlocking condition.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A door lock control system with a dead lock device for an automotive vehicle, comprising:

a door lock mechanism for locking and unlocking a vehicular door;

a door lock knob adapted to be disposed inside said vehicle to lock and to unlock said door;

a connecting mechanism placed between said door lock mechanism and said door lock knob, said connecting mechanism having a first position and a second position, wherein in said first position, said door lock mechanism is permitted locking and unlocking of said door using said door lock knob, while in said second position, said door lock mechanism is prevented from unlocking using said door lock knob;

a motion sensor for detecting movement inside said vehicle;

a connecting actuator for selectively positioning said connecting mechanism in one of said first position and said second position, said connecting actuator arranged to move said connecting mechanism from said second position to said first position, when said motion sensor detects movement inside said vehicle after said connecting mechanism is positioned in said second position;

a locking actuator, a lock controller, a first connection controller, a second connection controller;

said locking actuator being activated by a signal for positioning said door lock mechanism in one of a locking condition and an unlocking condition;

said lock controller outputting one of a lock signal and an unlock signal to said locking actuator;

said connecting mechanism positioned between said door lock mechanism and said door lock knob, said connecting mechanism having a first position and a second position, in said first position, said door lock mechanism and said door lock knob being connected to permit unlocking of said door using said door lock knob, and, in said second position, said door lock mechanism and said door lock knob being disconnected to prevent unlocking of said door using said door lock knob;

said connecting actuator positioning said connecting mechanism in one of said first position and said second position;

said first connection controller outputting to said connecting actuator one of a first signal to place said connecting mechanism in said first position and a second signal to place said connecting mechanism in said second position;

said second connection controller outputting said first signal to said connecting actuator to move said connecting mechanism from said second position to said first position, when said motion sensor detects movement inside said vehicle within a predetermined time after said vehicular door is locked and said connecting mechanism is positioned in said second position;

an invasion sensor for detecting an invasion into said vehicle; and an anti-theft controller for monitoring said vehicle by said invasion sensor after a predetermined time has elapsed since said vehicular door is locked and said connecting mechanism is placed in said second position, when said motion sensor detects movement inside said vehicle during said predetermined time;

said anti-theft controller monitors said vehicle with said invasion sensor and said motion sensor after a predetermined time has elapsed since said vehicular door is locked and said connecting mechanism is placed in said second position, when either said motion sensor does not detect movement inside said vehicle or said invasion sensor does not detect said invasion during said predetermined time.

2. The door lock control system as defined in claim 1, wherein:

said anti-theft controller ignores the status of said motion sensor when said motion sensor detects movement inside said vehicle during said predetermined time.

3. The door lock control system as defined in claim 1, wherein:

said motion sensor is disabled from monitoring said vehicle after said predetermined time has elapsed, when said motion sensor detects movement inside said vehicle during said predetermined time.

4. The door lock control system as defined in claim 1, wherein:

said anti-theft controller disconnects said motion sensor after said predetermined time has elapsed, when said motion sensor detects movement inside said vehicle during said predetermined time.

5. The door lock control system as defined in claim 1, wherein:

said motion sensor includes an ultrasonic sensor adopted to be disposed inside said vehicle.

6. The door lock control system as defined in claim 1, wherein:

said motion sensor includes an infrared sensor adopted to be disposed inside said vehicle.

7. The door lock control system as defined in claim 1, wherein said motion sensor includes:

a camera; and a processor for processing the image monitored by said camera.

8. The door lock control system as defined in claim 1, wherein said motion sensor includes:

a light emitter; and an optical sensor receiving said light emitted by said light emitter.

9. The door lock control system as defined in claim 1, wherein:

said invasion sensor includes a switch for detecting whether said door is open or closed.

10. The door lock control system as defined in claim 9, wherein said invasion sensor further includes:

a switch for detecting whether an engine hood of said vehicle is open or closed;

a switch for detecting whether a trunk lid of said vehicle is open or closed; and a switch for detecting whether a key cylinder disposed on said door is removed from said vehicle or not.

11. A door lock control system with a dead lock device for an automotive vehicle comprising:

a door lock mechanism for locking and unlocking a vehicular door;

a lock securing mechanism for securing said door lock mechanism in a secured condition;

a motion sensor for detecting movement inside said vehicle;

a lock securing controller for releasing said lock securing mechanism from said secured condition, when said motion sensor detects movement inside said vehicle after said lock securing mechanism secures said door lock mechanism;

an invasion detector for detecting an invasion into said vehicle; and a monitor controller for monitoring said vehicle with said invasion detector after a predetermined time has elapsed since said lock securing mechanism secures said door lock mechanism, when said motion sensor detects movement inside said vehicle during said predetermined time, wherein:

said monitor controller monitors said vehicle with said invasion detector and said motion sensor after a predetermined time has elapsed since said lock securing mechanism secures said door lock mechanism, when either said motion sensor does not detect movement inside said vehicle or said invasion detector does not detect said invasion during said predetermined time.

12. An automotive vehicle with a door lock control system including a dead lock device, comprising:

a door lock mechanism for locking and unlocking a vehicular door;

a door lock knob disposed inside said vehicle to lock said door and to unlock said door;

connecting means having a first position and a second position, in said first position, said door lock mechanism is permitted locking and unlocking of said door using said door lock knob, and, in said second position, said door lock mechanism is prevented from unlocking of said door using said door lock knob;

motion sensing means for detecting movement inside said vehicle;

invasion sensing means for detecting an invasion into said vehicle;

a first connection controlling means for outputting to said connecting means one of a first signal to place said connecting means in said first position and a second signal to place said connecting means in said second position;

a second connection controlling means for outputting said first signal to said connecting means to move said connecting means from said second position to said first position, when said motion sensing means detects movement inside said vehicle within a predetermined time after said vehicular door is locked and said connecting means is positioned in said second position; and anti-theft controlling means for monitoring said vehicle by said invasion sensing means after a predetermined time has elapsed since said vehicular door is locked and said connecting means is placed in said second position, when said motion sensing means detects movement inside said vehicle during said predetermined time;

said anti-theft controlling means monitors said vehicle with said invasion sensing means and said motion sensing means after a predetermined time has elapsed since said vehicular door is locked and said connecting means is placed in said second position, when either said motion sensing means does not detect movement inside said vehicle or said invasion sensing means does not detect said invasion during said predetermined time.

* * * * *